United States Patent
Bowman et al.

(10) Patent No.: US 11,840,213 B2
(45) Date of Patent: Dec. 12, 2023

(54) AI-CONTROLLED MULTI-CHANNEL POWER DIVIDER / COMBINER FOR A POWER-SPLIT SERIES ELECTRIC HYBRID HEAVY VEHICLE

(71) Applicant: ePower Engine Systems Inc, Florence, KY (US)

(72) Inventors: Jay J. Bowman, Florence, KY (US); Andrew Bowman, Florence, KY (US)

(73) Assignee: ePower Engine Systems Inc., Florence, KY (US)

( * ) Notice: Subject to any disclaimer, the term of this patent is extended or adjusted under 35 U.S.C. 154(b) by 465 days.

(21) Appl. No.: 16/576,851

(22) Filed: Sep. 20, 2019

(65) Prior Publication Data
US 2020/0094814 A1   Mar. 26, 2020

Related U.S. Application Data (60) Provisional application No. 62/734,597, filed on Sep. 21, 2018.

(51) Int. Cl.
| | |
|---|---|
| *B60W 20/14* | (2016.01) |
| *B60W 20/11* | (2016.01) |
| *B60L 58/13* | (2019.01) |
| *B60W 40/10* | (2012.01) |

(52) U.S. Cl.
CPC ............ *B60W 20/14* (2016.01); *B60L 58/13* (2019.02); *B60W 20/11* (2016.01); *B60W 40/10* (2013.01); *B60W 2520/105* (2013.01)

(58) Field of Classification Search
None
See application file for complete search history.

(56) References Cited

U.S. PATENT DOCUMENTS

| | | | |
|---|---|---|---|
| 6,651,759 B1* | 11/2003 | Gruenwald | B60K 6/54 903/917 |
| 8,783,396 B2* | 7/2014 | Bowman | B60L 58/21 180/65.285 |
| 10,384,559 B2* | 8/2019 | Kuttenkuler | B60L 15/2045 |
| 2005/0251299 A1* | 11/2005 | Donnelly | B60L 15/20 701/19 |

(Continued)

OTHER PUBLICATIONS

The International Search Report and The Written Opinion of the International Searching Authority for International Application No. PCT/US2019/052099, 16 pages.

*Primary Examiner* — Aniss Chad
*Assistant Examiner* — Jennifer M Anda
(74) *Attorney, Agent, or Firm* — LEECH TISHMAN FUSCALDO & LAMPL; Michael D. Lazzara (57) ABSTRACT

A method is provided for controlling power in a hybrid electric vehicle. The method may include receiving sensor input data in a computer-implemented artificial intelligence neural network operatively associated with the vehicle. The sensor input data may be generated in response to a travel condition or an operating state associated with the vehicle. The method may also include generating condition-based awareness signals with the artificial intelligence neural network; processing the condition-based awareness signals with control algorithms; and adjusting a power-related operating state of the vehicle in response to the processing performed by the control algorithm.

19 Claims, 4 Drawing Sheets

(56) References Cited

U.S. PATENT DOCUMENTS

| | | | |
|---|---|---|---|
| 2006/0076171 A1* | 4/2006 | Donnelly | B60L 7/12 |
| | | | 180/65.225 |
| 2006/0266256 A1* | 11/2006 | Donnelly | F02N 11/04 |
| | | | 105/61 |
| 2009/0198396 A1* | 8/2009 | Rodriguez | B60W 10/08 |
| | | | 701/22 |
| 2013/0166182 A1* | 6/2013 | Suzuki | B60W 10/02 |
| | | | 701/110 |
| 2016/0137185 A1* | 5/2016 | Morisaki | B60K 6/445 |
| | | | 701/22 |
| 2016/0355189 A1* | 12/2016 | Lin | B60L 3/06 |
| 2017/0256957 A1* | 9/2017 | Buiel | H02M 3/04 |
| 2017/0264284 A1* | 9/2017 | Xu | H03K 17/166 |
| 2017/0274776 A1* | 9/2017 | Xu | H01L 29/7396 |
| 2017/0274777 A1* | 9/2017 | Alam | H02J 7/1492 |
| 2018/0134279 A1* | 5/2018 | Barkdull | B60L 53/20 |
| 2018/0154787 A1* | 6/2018 | Chen | H02M 1/15 |
| 2018/0215269 A1* | 8/2018 | Alam | B60L 53/24 |
| 2018/0257473 A1* | 9/2018 | Follen | B60W 50/0097 |
| 2019/0184991 A1* | 6/2019 | Jang | B60W 20/14 |
| 2019/0232950 A1* | 8/2019 | Atluri | B60W 30/18145 |
| 2020/0067400 A1* | 2/2020 | Li | H02P 3/22 |
| 2020/0207219 A1* | 7/2020 | Slepchenkov | B60L 50/61 |

* cited by examiner

AI-CONTROLLED MULTI-CHANNEL POWER DIVIDER / COMBINER FOR A POWER-SPLIT SERIES ELECTRIC HYBRID HEAVY VEHICLE

CROSS-REFERENCE TO RELATED APPLICATION

This application claims the benefit of U.S. Provisional Patent Application Ser. No. 62/734,597, filed on Sep. 21, 2018, which is incorporated herein in its entirety by reference.

FIELD OF THE INVENTION

Various embodiments of the present invention generally relate to computer-based tools and techniques for monitoring and controlling propulsions systems of commercial-scale vehicles. In certain embodiments, the present invention more specifically relates to using artificial intelligence for electronically monitoring and controlling hydrocarbon fueled, electric series hybrid propulsion systems which power heavy vehicles under different operating states and environmental conditions.

BACKGROUND

A hybrid electric vehicle is powered by an electric motor and an internal combustion engine, including diesel or other hydrocarbon or fossil fueled engines. In a diesel-electric series hybrid propulsion system, the diesel engine is not directly linked to the transmission for mechanical drive power. Rather, the energy produced from the combustion engine is converted to electric power by a generator, which re-charges a battery in order to provide power to one or more electric motors. The electric motor system provides torque to turn the wheels of the vehicle. Because the combustion engine is not directly connected to the wheels, it can operate at an optimum rate and can be automatically or manually switched off for temporary all-electric, zero-emission operation of the vehicle. Conventional diesel-electric series hybrid propulsion systems are traditionally well-suited for lightweight commuting vehicles and stop-and-go transit buses, for example.

Current state of the art heavy truck solutions typically use a diesel engine connected to the rear wheels through a series of electronically or non-electronically controlled gear sets that mechanically increase or decrease the torque and provide power to the drive wheels. While proven durable over the last one hundred or so years, they offer no ability to collect and distribute the terrain potential energy or kinetic energy that is available to a heavy vehicle operating over a highway drive cycle. Such solutions typically include a parallel hybrid configuration used in line haul and or highway drive cycle applications. They offer limited increases in efficiency due to their limited electrical power assist to the main hydrocarbon motive power plant such as a diesel engine. Hybrid components also contribute to the mechanical drag of the vehicle when the hydrocarbon diesel engine is the sole power source used to power the vehicle.

State of the art light parallel electric hybrid vehicles use mechanical means through a planetary gear configuration with electrical controls as a power splitter/combiner to increase fuel economies in parallel hybrid vehicles. This type of system is limited by its mechanical architecture and electrical capacities in its ability to collect and distribute terrain potential energy in a heavy hybrid vehicle. State of the art heavy truck series hybrid drive trains are limited to city drive cycles such as busses and refuse collection vehicles due to their ability to recover energy from stop-and-go drive cycles. They are considered non-efficient at constant speed operation or highway drive cycles as in line-haul operations, due to the lack of stop and go braking events that collect kinetic energy from deceleration of the vehicle in line haul and or highway drive cycle applications.

In other aspects of traditional solutions, DC-to-DC inverters are typically used in a heavy hybrid vehicle to supply a regulated and conditioned battery power to a DC-to-AC converter or AC motor controller. These approaches are inefficient and prone to failure in a hybrid or full electric hybrid heavy vehicle due to the high fast switching times and high currents demanded by the heavy hybrid vehicle operating environment.

What are needed, therefore, are tools and techniques which leverage intelligent, condition-based analysis to respond in real time to changing operating states and travel conditions for vehicles with hybrid propulsion systems.

SUMMARY

In one embodiment, a method is provided for controlling power in a hybrid electric vehicle. The method may include receiving sensor input data in a computer-implemented artificial intelligence neural network operatively associated with the vehicle. The sensor input data may be generated in response to a travel condition or an operating state associated with the vehicle. The method may include generating condition-based awareness signals with the artificial intelligence neural network; processing the condition-based awareness signals with control algorithms; and adjusting a power-related operating state of the vehicle in response to the processing performed by the control algorithms.

In response to the processing performed by the control algorithms, various functions or tasks can be performed by the vehicle systems. For example, a duty cycle of a vehicle component can be adjusted, power can be charged power to an onboard power storage system, or power can be thermally dissipated to at least one vehicle component. Also, available power can be directed (or limited) for charging by a power source of the vehicle at a time of acceleration or deceleration of the vehicle during a drive cycle of the vehicle. Likewise, available power can be directed (or limited) for motive traction of the vehicle at a time of vehicle ascending or descending a grade during a drive cycle of the vehicle. In another example, the method may involve directing a power flow path during a braking regenerative power event of the vehicle, directing a power flow path during a terrain energy harvesting event during a drive cycle of the vehicle, or directing power to a bus used to charge at least one battery component of the vehicle. In another embodiment, and in further response to measuring a state of charge (SOC) level (e.g., an SOC for a battery), a flow of power can be directed to a braking resistor of the vehicle.

In addition, in response to the processing performed by the control algorithm, the system may determine whether to store energy in a power source of the vehicle in response to an altitude or grade associated with a current position of the vehicle, a current acceleration status of the vehicle, and/or a current location of the vehicle during a drive cycle of the vehicle (e.g., as determined by GPS data). Also, the system may determine whether to supplement power for a power-related component of the vehicle in response to an altitude or grade associated with a current position of the vehicle, a current acceleration status of the vehicle, and/or a current location of the vehicle during a drive cycle of the vehicle.

DESCRIPTION

In various embodiments, the present invention provides an artificial intelligently controlled multi-channel power divider/combiner for a power-split series electric hybrid heavy vehicle that enables the capture of potential energy from elevation changes in terrain and from kinetic energy of a rolling mass of a heavy truck operating in a line-haul or highway drive cycle. The invention offers an intelligent, condition-based awareness signal that can be utilized by electronic devices to respond in real-time to a changing operating or travel condition, or to a combination of such conditions. Among other problems, the inventors have recognized how power electronics, artificial intelligence, computer neural networks, GPS predictive controllers, and a myriad of sensors, coupled with machine learning, can be employed to increase the safety and efficiency of heavy-haul hybrid electric vehicles. These hybrid vehicles typically have either parallel hybrid drive trains or full electric drive trains designed for specific drive cycles in the trucking industry. In developing different embodiments of the present invention, the inventors have realized how state of the art heavy vehicle solutions have been limited with respect to issues with power assistance, thermal dissipation, and/or range provided over a given drive cycle.

Various embodiments of the present invention may be configured to operate in association with certain embodiments and features disclosed in U.S. Pat. No. 8,783,396 (issued Jul. 22, 2014 and entitled "Hydrocarbon Fueled-Electric Series Hybrid Propulsion Systems"). For example, embodiments of the present invention may be structured for use in connection with different components of a hydrocarbon fueled-electric series hybrid propulsion system on a hybrid electric vehicle. The hydrocarbon fueled-electric series hybrid propulsion system may comprise a hydrocarbon fueled engine, which is an internal combustion engine; hydrocarbon fuel tanks for receiving hydrocarbon fuel which is delivered to the engine; an AC generator mechanically connected to the engine via a shaft, which may be mechanically connected as a unit referred to as a "gen-set"; an AC/DC controller electrically connected to the AC generator by high voltage circuitry; a DC control relay; an AC control relay; DC battery packs; a CPU controller interface (e.g., located in the cab of the vehicle); a DC-pulsed charge computer control mounted at any suitable location on the vehicle; and, an AC electric drive motor, which in some embodiments may be an inverter duty motor, and which is mechanically connected via a shaft directly to the rear differential which, in turn, rotates wheels of the vehicle. Optionally, the system may include capacitor banks; an electrolyte circulation system; and/or an air brake system. The hydrocarbon fuel for the engine may include diesel, gasoline, ethanol, propane, natural gas, hydrogen synthetic fuel, and the like.

An embodiment of the invention consists of one or more inputs from sensors (either vehicle or cloud-based) that can be processed through an artificial intelligence (AI) neural network containing various algorithms designed to create a desired function or functions. The network outputs to one or more of the devices, such as logic-controlled switches, to enable the desired power management operations on the vehicle to be performed autonomously or semi-autonomously and in real time. In one embodiment of the present invention, an AI controlled multi-channel power divider is used to distribute power collected in a hybrid electric vehicle comprising at least one or more generators, fuel cells, battery packs, capacitors, resistors, along with different types of energy storage devices, powering an AC motor connected to the drive wheels directly or indirectly operated with a motor controller capable of developing regenerative electrical power after de-torque of an electrical drive motor. In another embodiment of the invention, the AI controlled multi-channel power divider uses algorithms to provide the most efficient collection, storage, distribution and use of terrain potential energy differentials and kinetic energy differentials in a series electric hybrid heavy-haul truck vehicle.

Other embodiments of the invention may use global positioning satellite or GPS data supplied to the AI controlled multi-channel power divider either by streaming from cloud-based databases via 3G/4G/5G mobile communication networks live streaming from space-based satellites, for example, or a vehicle-based network mapping storage database of a line haul or highway route or any other required drive cycle. This information is then used by the divider to collect, store and distribute available power in all forms in the most efficient manner, while handling thermal dissipation of the individual devices for a specific global position on a specific highway drive cycle. One embodiment of the invention provides input from other positioning sensors such as machine vision cameras, LIDAR, frequency modulated radar, as well as global positioning satellites, to enable the divider to control much of the system-level operation of measuring and managing power requirements to control overall consumption and the thermal dissipation of various electrical devices. The divider may be supplied with these additional inputs and machine learning algorithms onboard the vehicle, or from a cloud-based neural network or connected with area or other vehicle-based networks. This can allow the vehicle to operate effectively as a fully or partially autonomous vehicle over a line haul or highway drive cycle or any required specific drive cycle.

One embodiment of the invention may be used with standard ABS brake sensors communicating over a J1939 onboard network, for example, or other types of network, AI neural network or other types responsible for detecting the rotating position of a brake drum or caliper used to stop a vehicle in order to allow for a substantial decrease in braking response time and braking distance. This can be accomplished through directing the available regenerative breaking power of a series heavy hybrid or full electric heavy vehicle and distributing electrical energy to a battery or string of batteries (with or without capacitors) for storage for use with future propulsion requirements of the vehicle. This braking power can be made available to slow down the vehicle after releasing the throttle mechanically or electrically before the conventional mechanical braking power is available, resulting in reduced stopping time and controlled stopping distances.

An embodiment of the invention intelligently controls the direct collection, combination, storage and distribution of power flows among multiple power sources or devices, while conditioning the power being distributed between the devices for optimal control and collection of generated, stored or potential and kinetic energy available in the vehicle. In another embodiment, the invention may utilize the vehicle's potential energy temporal variations in a highway drive cycle caused by terrain or road grade changes and/or rolling mass kinetic energy temporal variations from the acceleration/deceleration of the vehicle to increase the fuel efficiency of the vehicle. The vehicle systems can be structured to optimize and electrically control power flow among several energy sources, while managing thermal dissipations of the various sources in the vehicle power configuration while the vehicle operates over a given drive cycle. In another embodiment, a system is provided for utilizing an intelligent, condition-based awareness signal used to direct the power electronic devices with one or more inputs and output channels to capture regenerative energy available from a rolling mass traveling over terrain with altitude changes in high definition, or vehicle decelerations during its drive cycle.

An embodiment of the invention controls the power electronic device creating multi-channel or single-channel pulse-width modulated (PWM) signals that are processed by control algorithms. The vehicle systems can combine and distribute available power for optimal drive cycle operations and fuel efficiency improvements when compared to conventional heavy haul vehicles using industry standard diesel-powered drive trains. In certain embodiments, the vehicle systems may control thermal dissipation for a DC storage system through the intelligent control signal supplied via power electronic devices driving a PWM switching IGBT or MOSFET that internally regulates this to a desired level for the charging and discharging duty cycle of a power storage device such as a DC storage device, for example. The vehicle systems may have control over one or more power supplies such as a generator or fuel cell supported by a secondary or tertiary power supply in a power-split series electric hybrid heavy vehicle. This allows enhanced amounts of regenerative energy to be collected, stored and distributed in the vehicle even as it is rolling over terrain with changing altitudes or grades, for example. The algorithms described herein can rival an experienced professional heavy truck driver in optimizing fuel efficiency, while the vehicle travels through a predetermined drive cycle route efficiently and safely.

In one embodiment, a method is provided for using position awareness of vehicle location over a highway drive cycle to optimize the efficient interaction of multiple power devices and storage device in the vehicle. This method may involve using position data to optimize the DC power storage contained in a single or string of batteries connected in series or parallel or combination of parallel or series in the vehicle over the drive cycle. This method may also involve using position data to increase the efficiency of multiple power sources and power storage devices working together in the vehicle by combining artificial intelligence algorithms with the power electronics of the vehicle systems.

In another embodiment, a method is used to reduce and control the oxygen and hydrogen recombination for certain batteries when a battery, which uses a recombination of oxygen and hydrogen to produce an electrical property, is at or close to a desired state of charge (SOC) by using two channels of the device directed by the condition aware signal of the device at optimal rates and frequencies divided by and recombined by the system, directed to a DC bus used for charging, or directed to a braking resistor for thermal dissipation.

Another embodiment of the invention can control a portion of the power output of a hydrocarbon fuel generator operating in the vehicle. This can be accomplished through a condition awareness algorithm combined with a location awareness algorithm to direct and condition the power to several devices or components, such as a DC storage system used to supplement or provide boost power to the operating generator. A method of dividing, conditioning, distributing and controlling the power in a shared power network operating in the vehicle can be provided, while controlling the thermal dissipation of the power devices. An embodiment of the invention uses sensory inputs along with artificial intelligence algorithms, machine learning algorithms, and a predetermined number of output channels to control the speed, acceleration and braking of the vehicle in an autonomous or semi-autonomous mode of operation. An embodiment of the invention containing additional sensory input can allow for close platooning of several vehicles in a safe and efficient manner through the rapid reaction times of the vehicle systems with regard to power control and other system devices and components. Response times on the order of milliseconds, for example, are expected reaction times for the power electronics and neural network algorithms used by the vehicle systems.

Figure 1:
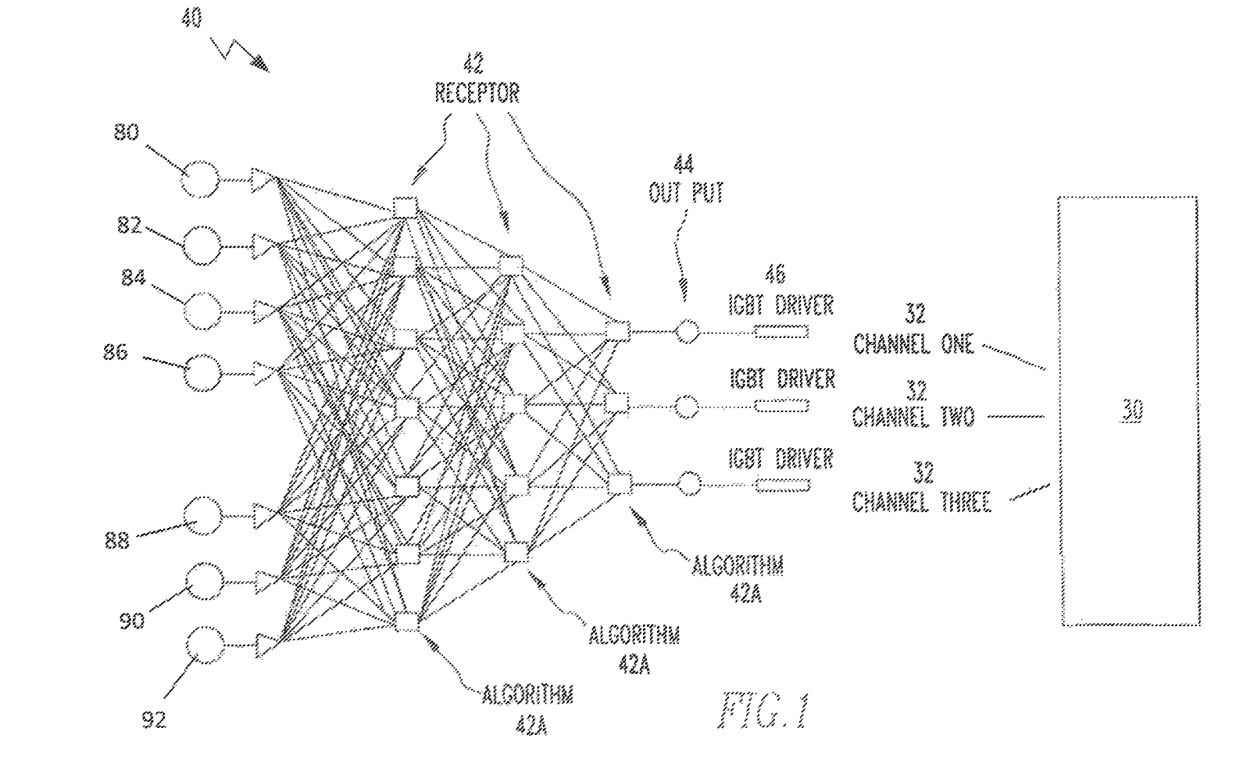
FIG. 1 schematically illustrates an example of an artificial intelligence controlled multi-channel power divider apparatus structured in accordance with various embodiments of the present invention.

FIG. 1 shows an embodiment of one example of an artificial intelligence (AI) controlled multi-channel power divider apparatus 40 comprising three channels 32 connected to an AI neural network 42 containing one or more input data sources 80, 82, 84, 86, 88, 90, 92. Although three channels 32 are shown in this example, it can be appreciated that more or less channels may be employed depending on a given application or use of the divider apparatus 40. As shown, the input data are received by electronic devices (neurons) that change states (activation function) dependent on a particular input received. The output is provided to one or more layers of internal devices or receptors that change state and activate one or more algorithms 42A that perform a comparison function based on the activation values and weighted (e.g., number of) receptions of the internal device. In one embodiment, a learning process can be obtained by modifying the weights and activation thresholds of the internal device parameters within the network 42. This can be done by real-time repetition while using standard back propagation algorithms, for example, to calculate the gradient of loss and function cost of a given internal device state and output signal. The learned behavior then can be transmitted via the output device, for example. The output of the AI network 42 can be embodied as one or more output signals 44, which can be communicated to one or more external channels 32 of the divider apparatus 40. The output signals 44 can be communicated via IGBT drivers 46 that then enable the specific control algorithms (e.g., duty cycle or PWM algorithms) to direct different operating states of the power-split series electric hybrid heavy vehicle, for example. Coupled with the machine learning process described herein, the output signals 44 of the AI neural network 42 can be considered intelligent, condition-based awareness signals.

In various embodiments, the inputs shown in FIG. 1 may be, for example and without limitation, gen-set data 80, battery data 82, AC system voltage data 84, DC system voltage data 86, system temperature data 88, GPS data associated with onboard storage, satellite real time or cloud-based, real-time data 90, driver input data throttle position, gear selected, cruise control and braking data 92, among other types of input data. The input data can be any other data derived from a sensor that has the capability to interact with the onboard network.

Figure 2:
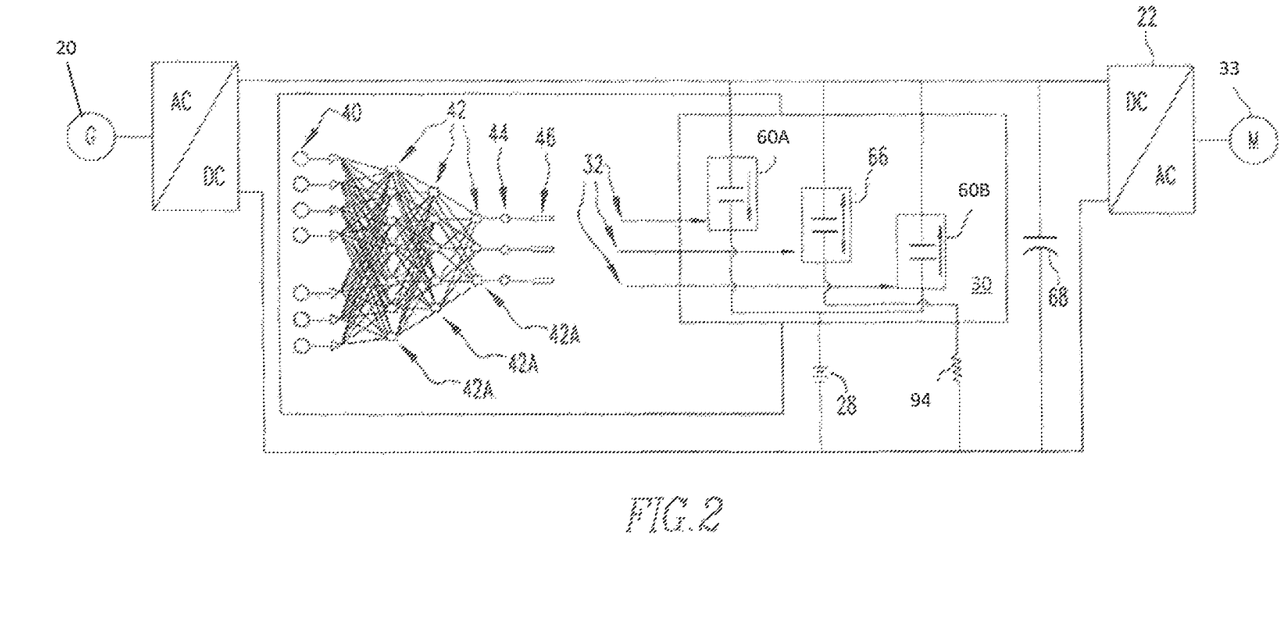
FIG. 2 schematically illustrates the divider apparatus of FIG. 1 operatively associated with and interfacing with certain power-related components of a hybrid electric vehicle.

FIG. 2 depicts a preferred embodiment of the invention used within a power-split series electric heavy hybrid vehicle power electronics control system, for example, including a hydrocarbon fueled generator 20 as a power source. Embodiments of the invention are not limited to use with this type of power source and may be used with optional power sources such as fuel cells or one or more batteries used to produce and supply an electrical current within a hybrid or full electric heavy hybrid vehicle drive train. The power source 20 may supply a portion of the power available to propel the vehicle equivalent to, for example and not limited to, the power required to maintain highway speed during normal at-weight operations of the vehicle. The power from the generator 20 can be supplied to an AC motor controller 22, for example.

The divider apparatus 40 may use multi-channel PWM switching to control, distribute and condition both thermal dissipation and charging power to the onboard DC storage system 28, which may comprise a battery or multiple batteries arranged in a parallel, series, or other combination of parallel or series circuits. The storage system 28 may be used with (or without) a capacitor system 68. Power supplied by the power source 20 can be controlled in a self-determined charging mode for the onboard DC storage 28, and directed by the intelligent output of the network (as an intelligent, condition-based awareness signal), which is communicated through the proper output IGBT driver 46 and connected to one of the available channels 32. For example, a channel one signal operates a unidirectional IGBT gate driver 60A to create the proper PWM signal for each real-time changing condition of the drive cycle of the vehicle after the condition has been identified by the divider apparatus 40. This regulation includes, for example and not limited to, controlling the C rate of charging for the DC storage system 28. This can include controlling and aiding the thermal dissipation of the system 28, as well as limiting and directing power available for charging by the power source 20 to the system 28 at times of acceleration and grade climbing by the vehicle, thereby optimizing the power available to the motor controller 22 and the traction motor 33. This also improves performance of the hybrid vehicle and increases the efficiencies of its power electronics system. The power for motive traction may be supplemented during times of vehicle acceleration or the climbing of grades by the onboard DC storage system 28, supplied to the drive motor 33 through the AC motor controller 22, for example.

In another example, channel two of the channels 32 may be configured to capture changes in terrain elevations along with a predetermined range of speed changes of a power-split series electric heavy hybrid vehicle operating at a highway drive cycle or any other required drive cycle. This regulation includes, for example and not limited to, controlling the C rate of charging for a given DC storage system 28 controlling and aiding the thermal dissipation of the system 28, or in certain situations to a braking resistor 94. Also, in another example, channel three of the channels 32 may be connected to a unidirectional IGBT gate driver 60B for manipulation of the C rate of discharge, voltage and current discharge curves, for example, to supply efficient and sufficient power to the AC motor controller 22 for use by the traction motor 33.

Figure 3:
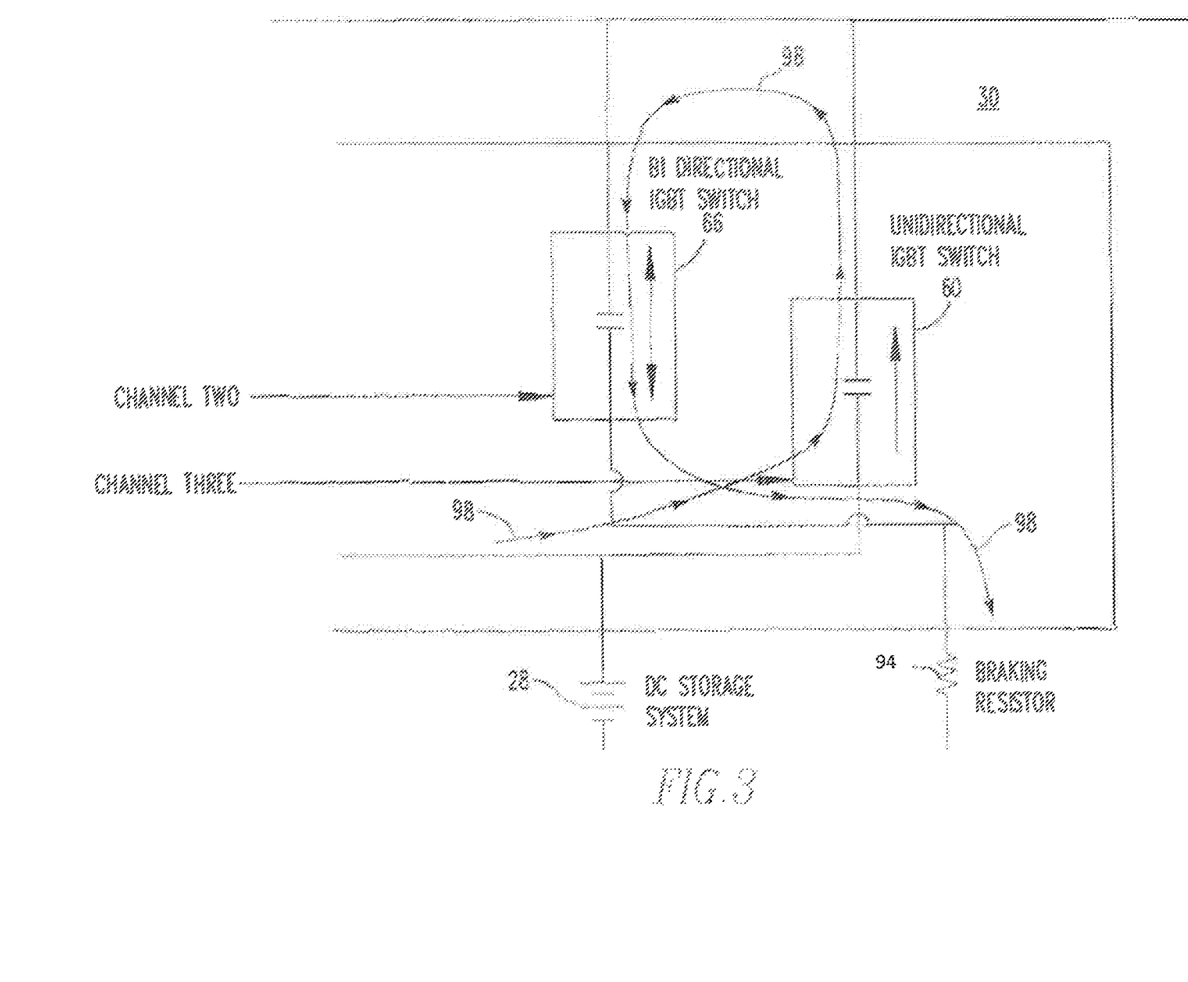
FIG. 3 highlights a portion of the divider apparatus and operatively associated vehicle components of FIG. 2 to illustrate the ability of a condition-based awareness signal to direct a power flow path.

FIG. 3 shows an example of the ability of a condition-based awareness signal to direct a power flow path 98 during a braking regenerative power event, terrain energy harvesting event, or deceleration-at-speed event within a power-split series electric hybrid heavy vehicle operating over a highway drive cycle. This approach gives complete intelligent control of a battery or battery string's oxygen and hydrogen recombination process based on real-time condition and position awareness over the drive cycle. This is accomplished by directing the power at a desired frequency and level via IGBT switch circuitry 30 to a DC bus used to charge a battery or batteries in a string using the recombination of oxygen and hydrogen to store or discharge electricity. At certain SOC, the flow of power can be directed at varying frequencies and or levels to alternative electrical devices such as a braking resistor 94 via switch 66, or perhaps a combination of two IGBT multi-channel switches, for example. The intelligent manipulation of energy from these sources allows the efficient harvesting of terrain, braking, and speed changes available to a power-split series electric hybrid heavy vehicle operating over a highway drive cycle, while optimizing the power collected and thermal dissipation of a battery or string of batteries that recombine oxygen and hydrogen to store or discharge an electrical current.

Figure 4:
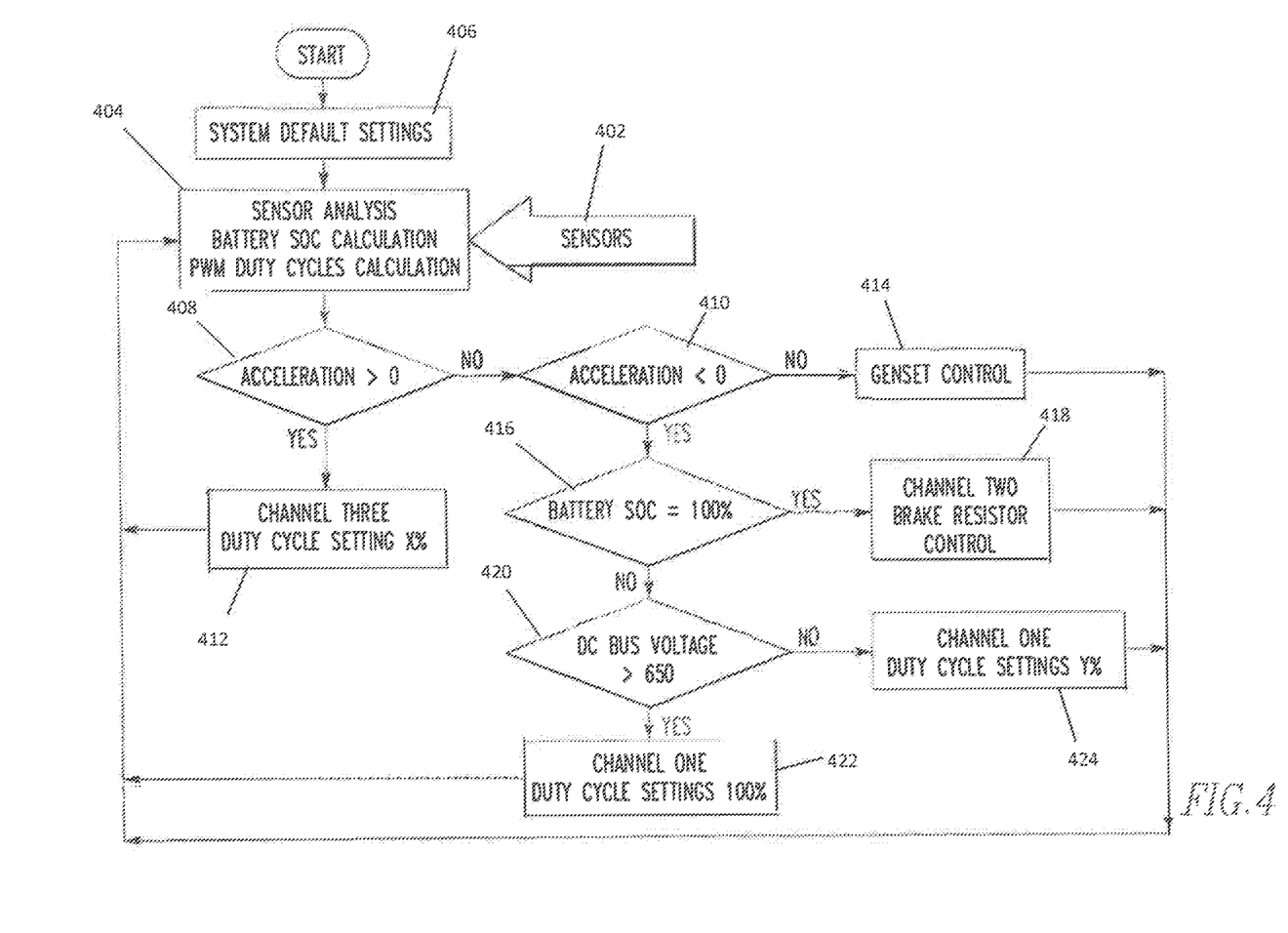
FIG. 4 is a flow chart illustrating certain processing aspects of various control algorithms applied in connection with certain embodiments of the present invention described herein.

FIG. 4 shows a high-level flow chart view illustrating certain examples of main control algorithms of the invention operating in a series electric hybrid heavy vehicle, from a start condition with external sensory inputs 402, as shown. At step 404 of the process, the sensor input data 402 can be analyzed, a battery SOC calculation can be performed, and/or a duty cycle calculation can be made. The purpose of these analyses and calculations is to determine whether one or more system default settings 406 of the vehicle should be adjusted in view of current operating or travel conditions of the vehicle. As noted above, such determinations may involve assessing whether to store energy in a power source of a vehicle system, to direct power flow to different location or component of the vehicle system, to thermally dissipate energy (e.g., through the braking resistor 94), to adjust a duty cycle setting associated with a vehicle system, and/or to perform other tasks or functions in response to an analysis or calculation. In certain embodiments, such determinations are impacted by whether the vehicle is accelerating or not, the current terrain (e.g., altitude or grade) over which the vehicle is traveling, the location of the vehicle (e.g., about to ascend or descend a mountain), and/or other factors.

At steps 408, 410 the process can determine whether current acceleration of the vehicle is positive or negative. If the vehicle acceleration is positive, then a duty cycle setting can be adjusted accordingly to a predetermined level (X %) at step 412. If the vehicle is not accelerating then genset control can be engaged at step 414. However, if it is determined at step 410 that the vehicle is decelerating, then the battery SOC calculation can be checked at step 416. If the battery SOC is at substantially 100% charge level, then the channel two brake resistor process (as described above) can be engaged at step 418. However, if the battery SOC is not at substantially 100% charge level, but a DC bus voltage exceeds a predetermined threshold voltage level (Vt, as determined at step 420), then the duty cycle setting can be set at 100% at step 422. In one embodiment, this threshold voltage level may be 650v, for example. Alternatively, if the battery SOC is not at substantially 100% charge level, and the DC bus voltage does not exceed the predetermined threshold voltage level (as determined at step 420), then the duty cycle setting can be set to a predetermined level (e.g., Y %) at step 424. It can be appreciated that the processing at step 424 may be in accordance with accessing channel one of the divider apparatus 40 and its associated downstream functions (as described above).

For purposes of the description above, it is to be understood that the invention may assume various alternative variations and step sequences except where expressly specified to the contrary. Moreover, other than in any operating examples, or where otherwise indicated, all numbers expressing, for example, quantities of ingredients used in the specification and claims, are to be understood as being modified in all instances by the term "about". Accordingly, unless indicated to the contrary, the numerical parameters set forth are approximations that may vary depending upon the desired properties to be obtained by the present invention. At the very least, and not as an attempt to limit the application of the doctrine of equivalents, each numerical parameter should at least be construed in light of the number of reported significant digits and by applying ordinary rounding techniques.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention as described and claimed herein.

What is claimed is:

1. A method for controlling power in a hybrid electric truck vehicle, the method comprising:
    receiving sensor input data in a computer-implemented artificial intelligence neural network operatively associated with the vehicle, wherein at least a portion of the sensor input data is generated in response to at least one travel condition associated with the vehicle and at least one operating state associated with the vehicle;
    generating at least one condition-based awareness signal with the artificial intelligence neural network;
    processing the condition-based awareness signal with at least one control algorithm programmed for:
        modifying at least one weight and at least one activation threshold of at least one internal device parameter of the neural network, using real-time repetition while using at least one back propagation algorithm to calculate at least one gradient of loss or at least one function cost of at least one internal device state and its associated output signal, and,
        adjusting at least one power-related operating state of the vehicle, wherein adjusting the power-related operating state comprises:
            directing power flow from a current location or current component of the vehicle to a different location or different component of the vehicle by processing at least one multi-channel pulse-width modulated (PWM) signal, and
            adjusting at least one duty cycle setting of at least one power component associated with the vehicle.

2. The method of claim 1, further comprising, in response to the processing performed by the control algorithm, adjusting a duty cycle of at least one vehicle power storage component.

3. The method of claim 1, further comprising, in response to the processing performed by the control algorithm, charging power to an onboard power storage system.

4. The method of claim 1, further comprising, in response to the processing performed by the control algorithm, thermally dissipating power to at least one vehicle component.

5. The method of claim 1, further comprising, in response to the processing performed by the control algorithm, directing power available for charging by a power source of the vehicle at a time of acceleration or deceleration of the vehicle during a drive cycle of the vehicle.

6. The method of claim 1, further comprising, in response to the processing performed by the control algorithm, adjusting power available for motive traction of the vehicle at a time of vehicle ascending or descending a grade during a drive cycle of the vehicle.

7. The method of claim 1, further comprising, in response to the processing performed by the control algorithm, directing a power flow path during a braking regenerative power event of the vehicle.

8. The method of claim 1, further comprising, in response to the processing performed by the control algorithm, directing a power flow path during a terrain energy harvesting event during a drive cycle of the vehicle.

9. The method of claim 1, further comprising, in response to the processing performed by the control algorithm, directing power to a bus used to charge at least one battery component of the vehicle.

10. The method of claim 1, further comprising, in response to the processing performed by the control algorithm, and in further response to a state of charge level, directing a flow of power to a braking resistor of the vehicle.

11. The method of claim 1, further comprising, in response to the processing performed by the control algorithm, determining whether to store energy in a power source of the vehicle.

12. The method of claim 11, further comprising determining whether to store energy in the power source of the vehicle in response to an altitude or grade associated with a current position of the vehicle.

13. The method of claim 11, further comprising determining whether to store energy in the power source of the vehicle in response to a current acceleration status of the vehicle.

14. The method of claim 11, further comprising determining whether to store energy in the power source of the vehicle in response to current location data of the vehicle during a drive cycle of the vehicle.

15. The method of claim 1, further comprising, in response to the processing performed by the control algorithm, determining whether to supplement or limit power for a power-related component of the vehicle.

16. The method of claim 15, further comprising determining whether to supplement or limit power for the power-related vehicle component in response to an altitude or grade associated with a current position of the vehicle.

17. The method of claim 15, further comprising determining whether to supplement or limit power for the power-related vehicle component in response to a current acceleration status of the vehicle.

18. The method of claim 15, further comprising determining whether to supplement or limit power for the power-related vehicle component in response to current location data of the vehicle during a drive cycle of the vehicle.

19. A system configured for controlling power in a hybrid electric truck vehicle, the system comprising:
- at least one sensor configured for receiving sensor input data, wherein at least a portion of the sensor input data is generated in response to at least one travel condition and at least one operating state associated with the vehicle;
- a computer-implemented artificial intelligence neural network operatively associated with the vehicle, the neural network programmed for:
  - receiving the sensor input data, and
  - generating at least one condition-based awareness signal in connection with processing the sensor input data; and,
- a divider apparatus programmed for:
  - executing at least one computer-implemented control algorithm for processing the condition-based awareness signal, wherein the control processing algorithm is further programmed for:
    - modifying at least one weight and at least one activation threshold of at least one internal device parameter of the neural network using real-time repetition while using at least one back propagation algorithm to calculate at least one gradient of loss or at least one function cost of at least one internal device state and its associated output signal, and,
  - adjusting at least one power-related operating state of the vehicle in response to the processing performed by the control algorithm, wherein adjusting the power-related operating state comprises:
    - directing power flow from a current location or current component of the vehicle to a different location or different component of the vehicle by processing at least one multi-channel pulse-width modulated (PWM) signal, and
    - adjusting at least one duty cycle setting of at least one power component associated with the vehicle.

* * * * *